United States Patent [19]
Campbell, Jr. et al.

[11] 3,906,615
[45] Sept. 23, 1975

[54] METHOD FOR FEEDING AND DRIVING TACKS

[75] Inventors: Robert L. Campbell, Jr.; Hal Lee Smith, both of Hickory, N.C.

[73] Assignee: Automated Manufacturing Systems, Inc., Hickory, N.C.

[22] Filed: Sept. 19, 1973

[21] Appl. No.: 398,677

[52] U.S. Cl. ............... 29/432; 227/102; 227/112; 227/117; 227/126; 227/130
[51] Int. Cl.² ...................................... B23P 11/00
[58] Field of Search .......... 227/100, 102, 112, 114, 227/115, 117, 119, 123, 125, 126, 129, 130, 227/134, 138, 139, 116, 137; 221/175, 198, 221/225, 228; 29/432; 302/2 R, 19, 66

[56] References Cited
UNITED STATES PATENTS

| | | |
|---|---|---|
| 1,877,162 | 9/1932 | Day .................................. 227/137 |
| 2,534,140 | 12/1950 | Moore ............................... 227/112 |
| 3,339,799 | 9/1967 | Spisak .............................. 221/278 |
| 3,348,291 | 10/1967 | Niedzwiecki ....................... 227/114 |
| 3,516,574 | 6/1970 | Andre et al. ....................... 221/278 |
| 3,525,846 | 8/1970 | Spisak .............................. 221/278 |
| 3,540,622 | 11/1970 | Spisak .............................. 221/278 |
| 3,553,816 | 1/1971 | Arnshav ............................. 227/112 |
| 3,606,128 | 9/1971 | Cast et al. ......................... 227/130 |
| 3,647,129 | 3/1972 | Ehrlich ............................. 227/112 |
| 3,764,054 | 10/1973 | Monacelli .......................... 227/114 |

*Primary Examiner*—Richard J. Herbst
*Assistant Examiner*—James R. Duzan
*Attorney, Agent, or Firm*—Parrott, Bell, Seltzer, Park & Gibson

[57] ABSTRACT

A method and apparatus for feeding and driving tacks of the upholstery type having a short shank and a relatively large head and wherein each successive tack is pneumatically conveyed, shank first, through a flexible tube into a tack driving gun. The gun has a tack receiving passage in which each successive tack is aligned for firing the same into a workpiece by positioning the front surface of the head of the tack in engagement with a yieldable restraining abutment means and with the shank of the tack extending forwardly parallel to the axis of the passage. A striking force then is applied to the head of the thus aligned tack to drive the same forwardly past the abutment means and through the passage into the workpiece.

4 Claims, 29 Drawing Figures

METHOD FOR FEEDING AND DRIVING TACKS

This invention relates to an improved method and apparatus for feeding and driving upholstery tacks and similar fasteners which normally are very difficult to control as compared to ordinary nails, rivets and other types of fasteners, when feeding and driving the same into a workpiece, because of the fact that such tacks have a short shank and a relatively large diameter head as compared to the diameter of the shank.

In order to provide a large, substantially continuous supply of tacks for a tack driving gun, it has been proposed by the prior art to pneumatically convey successive tacks head first from a central supply source through a flexible conveyor tube and into the tack driving gun with means, in the form of a cam surface, being provided adjacent the gun for inverting the conveyed tacks so that the tacks are received, shank first, in the gun. Since such tacks are propelled through the tube at high speed, if the tacks were fed into the tube shank first, as would be desirable, the pointed ends thereof would penetrate into or otherwise become embedded in the wall of the tube. This not only would damage the tube, but it would either impede the travel of the tack or block the tube against the travel of succeeding tacks therethrough.

Difficulties have been encountered with the prior art apparatus in that successive tacks would not always be turned over and inverted by the cam surface adjacent the gun, especially if the gun and the end of the tube connected thereto were tilted at various angles while in use. Additionally, no satisfactory means have been provided heretofore for axially aligning the shank of each successive tack with the axis of the passage or barrel through which the tack was to be ejected into a workpiece, it being well known that the shank of a tack must extend perpendicular to the workpiece so that the force of the usual striker or hammer will act in a direction aligned with the longitudinal axis of the shank of the tack to properly drive the tack into the workpiece without bending the tack.

It is therefore an object of this invention to provide an improved method and apparatus for successively feeding, aligning and driving tacks of the type described wherein each successive tack is fed, shank first, from a source to a tack driving gun to avoid the need for inverting the tacks in their course to the gun, and wherein each successive tack is accurately aligned with a tack receiving passage of the gun and thereby positioned to be properly driven into a workpiece.

It is a more specific object of this invention to provide a method and apparatus for feeding tacks of the tyde described wherein the shank of each back is provided with a blunt free end and each successive tack is positioned, shank first, adjacent one end of a flexible tube having its other end connected to a tack driving gun. Each successive tack thus positioned is pneumatically conveyed into and forwardly along the tube and into the tack driving gun with the leading blunt end on the shank of each successive tack serving to prevent the tack from piercing and damaging or being arrested by the wall of the flexible tube.

It is still another object of this invention to provide a method and apparatus for aligning and driving tacks of the type described into a workpiece, wherein each successive tack is positioned, shank first, in a tack receiving passage of the gun from which the tack is to be fired, and wherein the shank of the tack is aligned with the axis of the passage by positioning the front surface of the head of the tack in engagement with a yieldable restraining abutment means so that the shank of the tack extends forwardly parallel to the axis of the passage, and whereupon a forward striking force is applied to the thus positioned tack to drive the same forwardly past the abutment means and through the passage into the workpiece.

Some of the objects and advantages of the invention having been stated, others will appear as the description proceeds when taken in connection with the accompanying drawings, in which --

Figures 1, 2, 3, 4:
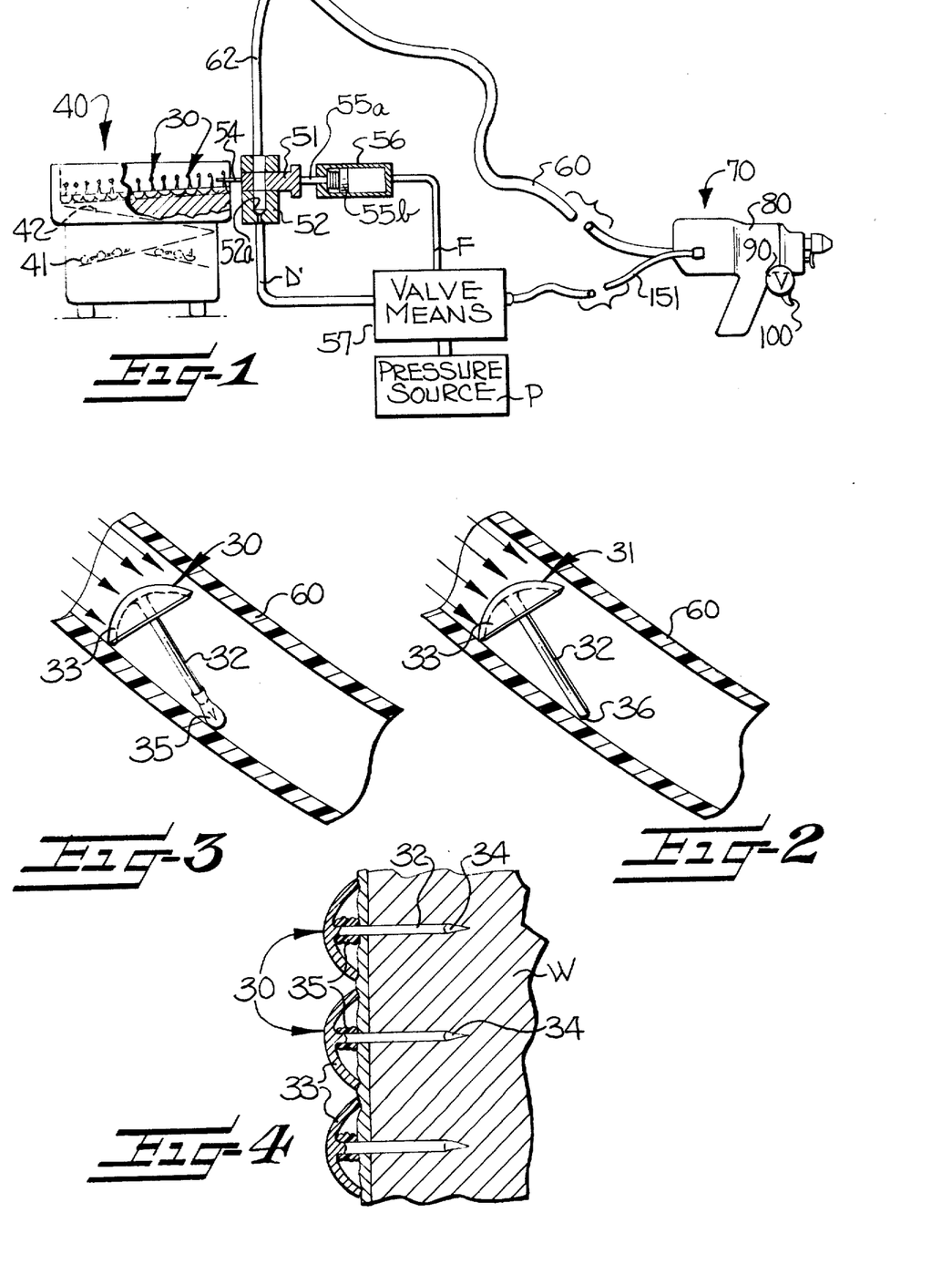
FIG. 1 is a schematic view of a preferred embodiment of the tack feeding and driving apparatus for carrying out the method of this invention.
FIGS. 2 and 3 are enlarged fragmentary views of a medial portion of the conveyor tube of FIG. 1 showing two forms of blunt free ends which may be provided on the shanks of respective tacks to facilitate their travel along the tube.
FIG. 4 is a fragmentary view of a few of the tacks of the type shown in FIG. 3, showing the same embedded in a workpiece.

The method and apparatus of this invention is particularly adapted for use in feeding and driving upholstery tacks and similar fasteners of the type shown in FIGS. 2, 3 and 4, which tacks are representative of typical upholstery tacks with the exception of being provided with blunt free ends of the shanks thereof. The tack shown in FIG. 3 is indicated at 30 and the tack shown in FIG. 2 is indicated at 31.

Both tacks 30, 31 are of the same general construction in that each of them includes a relatively short shank 32 and a relatively large head 33 which may be flat or may be concavo-convex as shown. It should be noted that a typical one-half inch upholstery tack, for example, has a concavo-convex head slightly less than one-half inch in diameter, it has an overall length of about ¾ inch and it has a shank about 3/64 inch in diameter. The shank projects about ½ inch to 9/16 inch beyond the plane of the head of the tack. Thus, as is usual in the case of upholstery tacks, the head 33 of each tank 30, 31 is of a diameter many times greater than the diameter of the shank 32, and the overall length of each tack 30, 31 is greater than the diameter of the head 33, but less than twice the diameter of the head. Consequently tacks of this type, when resting on or moving along a surface, are tilted at an angle to the surface, thus presenting impingement and aligning problems not encountered with conventional nails in conveying the same into and discharging the same from a gun into a workpiece.

Several of the tacks 30 are shown driven into a surface material or workpiece W in FIG. 4. It will be observed that each of the tacks 30 of FIG. 4 is provided with a pointed free end 34 on the shank 32 thereof, as is conventional. In order to facilitate pneumatic conveying of successive tacks 30 from a substantially continuous source of supply 40 (FIG. 1), along a flexible tack conveyor tube 60 and into a tack driving gun 70 with the shank 32 of each successive tack facing forwardly and without the necessity of inverting the tacks in their course to the gun 70, the shank of each tack is provided with a blunt free end. For example, the form of tack indicated at 30 in FIGS. 3 and 4 is provided with a bulbous plastic tip 35 which encloses the pointed free end 34 of the shank 32 of each tack 30 and thereby provides a blunt free end on the shank 32 to prevent the leading end of the tack from penetrating into or otherwise becoming embedded in the wall of the flexible conveyor tube 60. In this regard, it is preferred that the conveyor tube 60 is made from a suitable pliable material, such as translucent plastic, so as to withstand extensive use and to permit free manipulation of the gun 70 by an operator. To aid in proper guidance of each tack therealong, tube 60 should be of an internal diameter only slightly greater than the diameter of the head of each tack 30 or 31; e.g., the inside diameter of tube 60 may be 0.10 to 0.062 inch greater that the tack head diameter.

It is preferred that the enclosing tip 35 on the shank 32 of each tack 30 (FIG. 3) is made from a plastic material which may be readily punctured and displaced when the tacks 30 are driven into the workpiece W as shown in FIG. 4, so that the plastic material will be displaced along the shank by the workpiece W and, in the event of the head 33 of the corresponding tack 30 being concavo-convex, as shown, it can be seen that the plastic material in the tip 35 will be hidden within the concave area of the head 33 of the tack 30 when it is driven home in the workpiece.

As heretofore stated, the form of tack 31 shown in FIG. 2 is quite similar to the form of tack 30 shown in FIG. 3. However, instead of providing a plastic tip on the shank 32 of tack 31 in order to facilitate passage of the same along conveyor tube 60, it will be observed that the tack 31 in FIG. 2 is simply provided with a flattened or somewhat rounded free end 36 on the shank 32 of tack 31. Tacks of the type indicated at 31 may be manufactured with the slightly rounded or flattened ends 36 on the shanks 32 thereof.

FIRST EMBODIMENT OF TACK DRIVING GUN

Figures 5, 6:
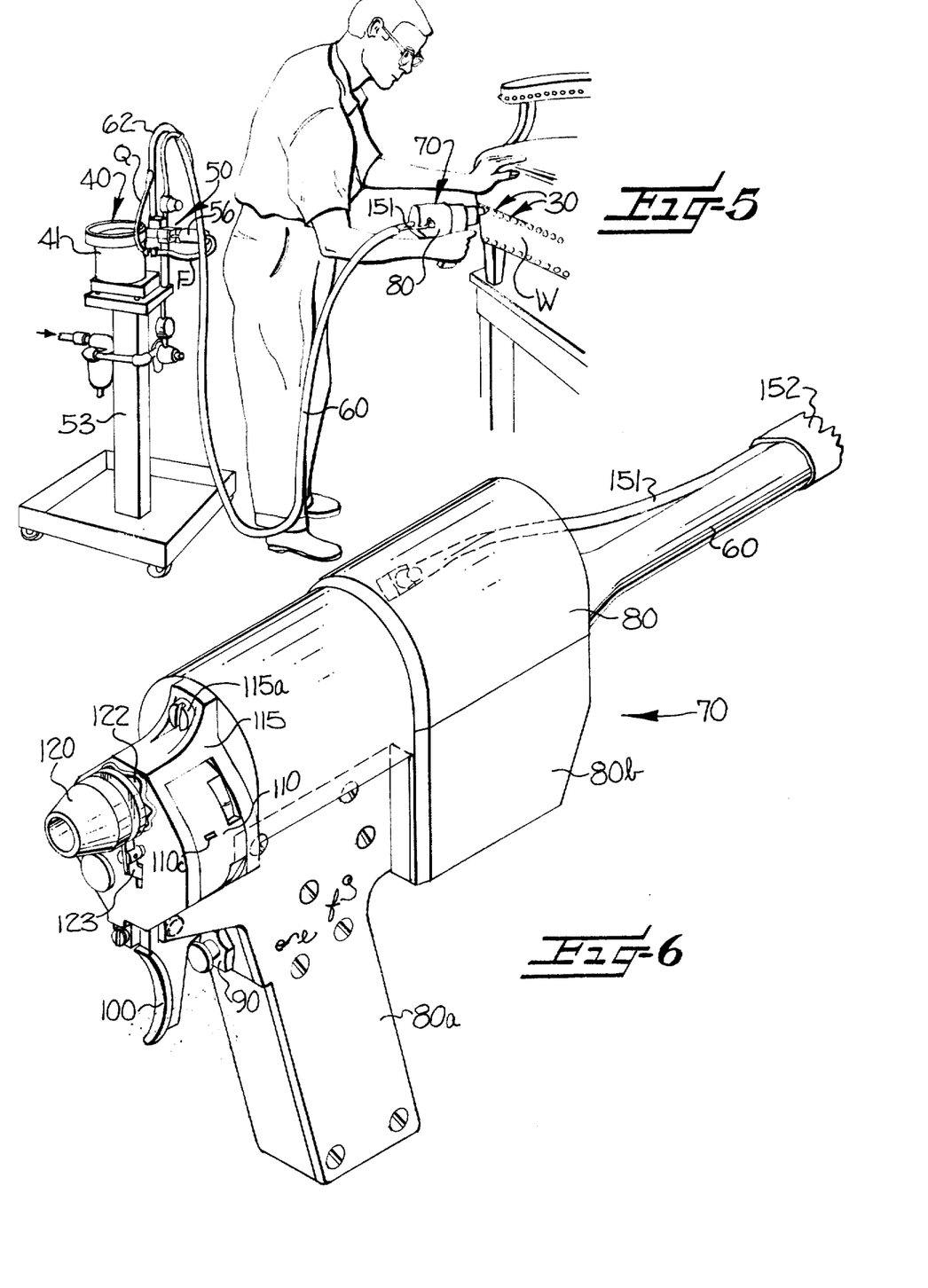
FIG. 5 is a perspective elevation of the preferred embodiment of the tack feeding and driving apparatus.
FIG. 6 is a greatly enlarged perspective view of the tack driving gun shown in the right-hand portions of FIGS. 1 and 5, but showing the tack driving gun facing in the opposite direction from that shown in FIGS. 1 and 5.
Figures 7, 8:
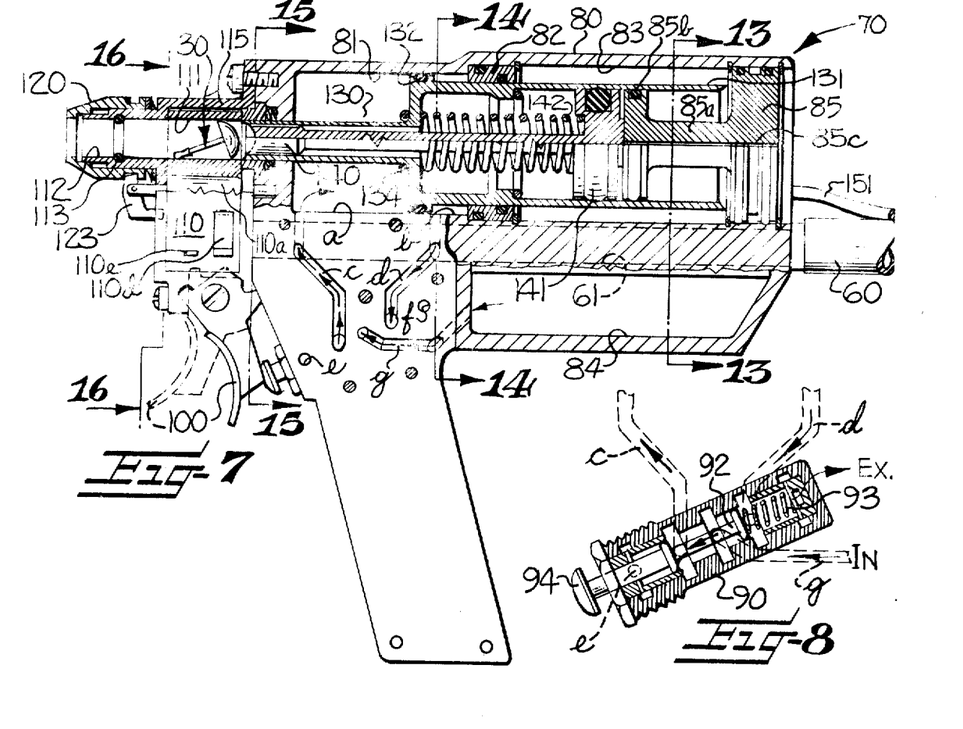
FIG. 7 is a longitudinal vertical section view, partially in elevation, with the upper portion of the gun of FIG. 6 being shown along a plane corresponding to the longitudinal axis of the discharge barrel and nozzle of the tack driving gun, and also showing the various movable parts of the gun occuping a position of rest with the exception of the trigger having been moved sufficiently to rotate the magazine cylinder to position a tack in alignment with the discharge nozzle.
FIG. 8 is a greatly enlarged fragmentary vertical sectional view through a trigger-actuated pilot valve with the core thereof occuping a position of rest corresponding to FIG. 7.
Figures 15, 16:
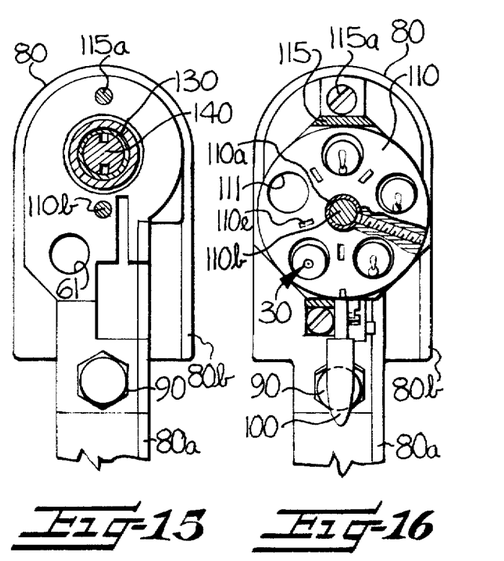

Referring now to the first embodiment of the tack driving gun, which is best shown in FIGS. 6–20, the gun 70 generally comprises a main housing 80 whose forward portion contains a pilot valve 90 (FIGS. 1, 8 and 10) actuated by a manually operable trigger 100 which, through means to be later described, also imparts stepwise angular movement to a rotatable magazine or tack indexing cylinder 110. As shown in FIGS. 16 and 18, magazine 110 is provided with a plurality of circularly spaced tack receiving cells or chambers 111, there being five such equally spaced chambers 111 circularly arranged about the axis of magazine 110 in this instance. The tack receiving chambers 111 are arranged so that, when trigger 100 is activated, each successive chamber 111 is moved to and occupies a tack receiving position or station in alignment with a primary tack receiving or conveying passage 61 (FIGS. 7 and 17-20 ) which extends longitudinally of housing 80 from the rear end to the front end thereof and has the egress end of tack conveyor tube 60 communicating therewith, the egress end of conveyor tube 60 being suitably attached to the rear end of the housing 80 of gun 70 (FIGS. 5, 6 and 7).

As each successive tack receiving chamber 111 of magazine 110 occupies the tack receiving station, another of the tack receiving chambers 111 occupied s tack driving position or station in axial alignment with an open-ended gun barrel 112 and a discharge nozzle 120. It should be noted that the open-ended barrel 112 and nozzle 120 collectively define, with the magazine chamber 111 aligned therewith, a secondary tack receiving passage also serving as a tack discharge or ejecting passage.

Barrel 112 and the outlet of nozzle 120 are both of an internal diameter substantially the same as that of each of the tack receiving chambers 111 of magazine 110 and tack receiving passage 61, which diameter should be only slightly greater than the diameter of the head 33 of the corresponding tacks 30 or 31, as the case may be. Although either or both types of tacks 30, 31 may be used in the further description of gun 70, the tacks referred to will be identified by the numeral 30.

TACK ALIGNING AND STRIKER MEANS

As each successive tack receiving chamber 111 occupies the tack driving station, it also is aligned with a normally inactive tack aligning means or aligning sleeve 130 and a normally inactive tack striker means or striker member 140 coaxially of and mounted for longitudinal or axial movement along and within tack aligning sleeve 130. Striker member 140 should be of less diameter than abutment means 113 so as to clear the same as striker member 140 passes through abutment means 113. Tack aligning sleeve 130 is mounted for axial sliding movement in a forward portion of gun housing 80 and is of an external diameter slightly less than the internal diameter of the tack receiving chambers 111 and gun barrel 112 so that, as each successive tack receiving chamber 111 is moved to and occupies the tack driving station, tack aligning sleeve 130 may be moved into and through the corresponding chamber 111 and into barrel 112, by means to be later described, so that the relatively thin annular leading end thereof engages the rear surface of the head of the corresponding tack 30 in FIG. 7 and pushes the same forwardly. In so doing, tack aligning sleeve 130 moves forwardly under relatively light pressure to move the shank of the corresponding tack 30 through a resilient or yieldable restraining abutment means 113 in barrel 112 while positioning the head 33 of tack 30 against abutment means 113. The yieldable abutment means 113 may be in the form of a circularly arranged or annular series of spring-loaded or resilient detents, but it is preferred that abutment means 13 is in the form of an annular spirally wound metal spring or, as shown, in the form of a resilient O-ring made from natural or synthetic rubber and fitting in a suitable shallow peripheral groove in barrel 112. In any event, the abutment means 113 should project into the path of the head of each successive tack 30 at the tack driving station so as to be engaged by a narrow portion of the leading surface of the head of each successive tack. However, the abutment means 113 must be capable of yielding and being displaced radially outwardly, out of the path of the tack head, by the tack head itself whenever a relatively quick or high-speed forward striking force is applied to the head of the tack.

Since abutment means 113 extends perpendicular to the axis of barrel 112, the forward peripheral surface portion of the head 33 of the corresponding tack engaging abutment means 113 is caused also to occupy a position perpendicular to the axis of the barrel 112 and nozzle 120 so that, in turn the shank 32 of the tack 30 is positioned to extend parallel to the axis of barrel 112 and nozzle 120.

Figures 9, 10:
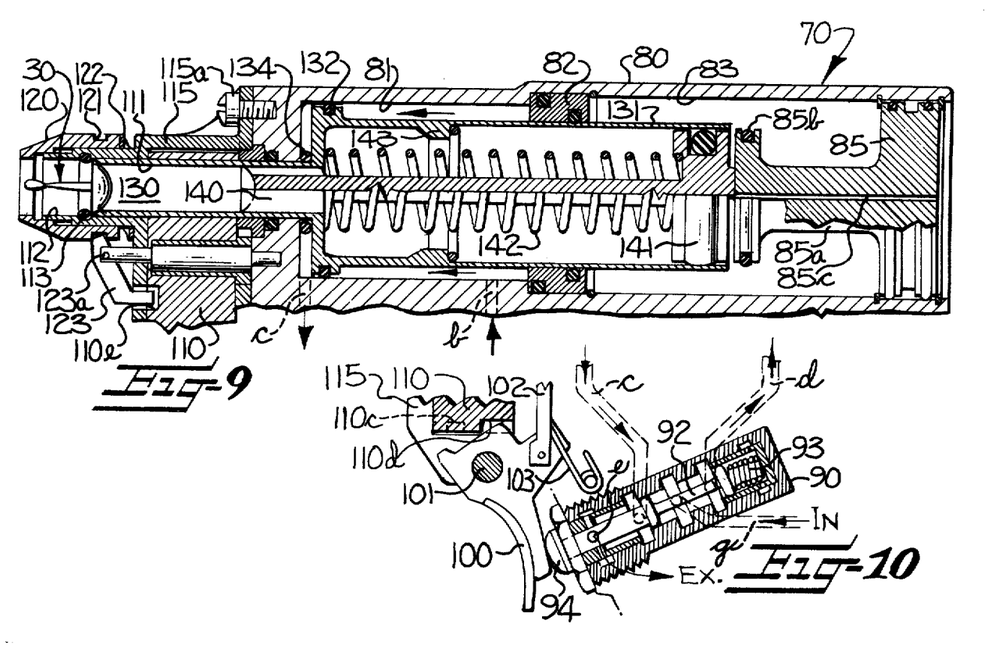
FIG. 9 is an enlarged fragmentary vertical sectional view similar to the upper portion of FIG. 7, but showing the position to which parts of the gun are moved upon initially moving the trigger to a fully active position, and particularly illustrating the head of the tack engaging the yieldable abutment means in the barrel of the gun.
FIG. 10 is a view similar to FIG. 8, but showing the position occupied by the core of the pilot valve when the trigger occupies fully active position.
Figure 11:
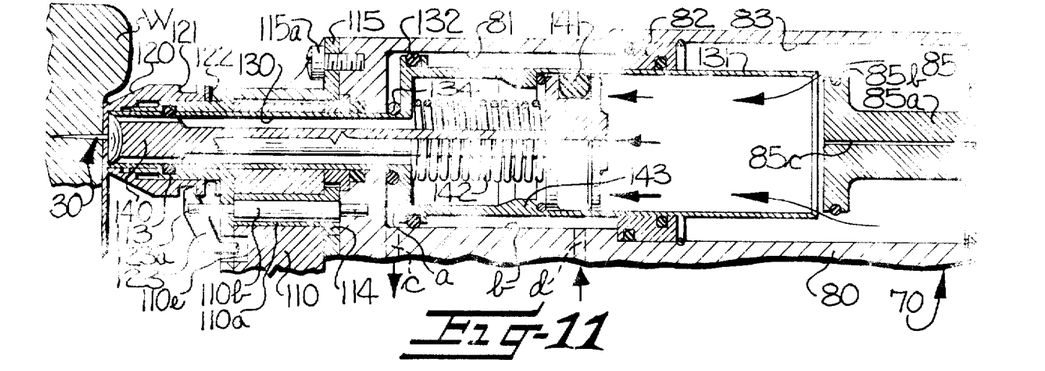
FIGS. 11 and 12 are views similar to FIG. 9 illustrating further successive stages in the operation of the gun.

Thus, after the tack aligning sleeve 130 has moved forwardly from the position of FIG. 7 to that of FIG. 9, striker member 140 is moved forwardly at a high rate of speed and under relatively high pressure and moves forwardly beyond the front end of tack aligning sleeve 130 to thus force the head of the tack 30 past the yieldable abutment means 113, during which the yieldable abutment means 113 is deformed or displaced sufficiently to permit the head of the corresponding tack 30 to pass therethrough. Thereafter, with continued forward movement of striker member 140, the front surface of the head of tack 30 is moved to a position about flush with the discharge end of nozzle 120 as the shank of the tack is driven into the surface material or workpiece W as shown in FIG. 11. Upon trigger 100 being released subsequently by the operator, aligning sleeve 130 and striker member 140 are returned to the inactive position of FIG. 7, as will be later described.

Referring now to the gun more in detail, it will be observed in FIGS. 7, 9, 11, 12, 14 and 20 that the upper forward portion of gun housing 80 defines a relatively large longitudinally extending main fluid pressure cylinder 81 which is axially aligned with gun barrel 112 and nozzle 120. Tack aligning sleeve 130 is of substantially lesser external diameter than and extends into main cylinder 81, where the sleeve is communicatively connected to the interior of an aligner cylinder or auxilary cylinder 131 generally in the form of a sleeve extending axially within cylinder 81. Aligner cylinder 131 is longer than main cylinder 81 but is of substantially less external diameter than the internal diameter of main cylinder 81, with the exception of an enlarged annular aligner piston 132 of relatively short axial length on the front end of aligner cylinder 131. Piston 132 has suitable annular peripheral sealing means thereon which slides against the inner surface of main cylinder 81.

Piston 132 also serves as a closure for the front end of cylinder 131 with the exception of such front end being in open communication with tack aligner sleeve 130. Sleeve 130 and piston 132 may be integral with each other. A closure sleeve or collar 82 encircles a medial portion of aligner cylinder 131 and is positioned in a medial portion of housing 80 to serve as the annular rear wall of main cylinder 81. Additionally, closure collar 82 serves as a partition between main cylinder 81 and a cylindrical main pressure chamber 83 which may be substantially axially aligned with main cylinder 81 and which communicates, through suitable ports 83a (FIGS. 13 and 20) with a pressure reservoir chamber 84 (FIGS. 7, 13 and 20) in the lower rear portion of gun housing 80.

Figure 12:
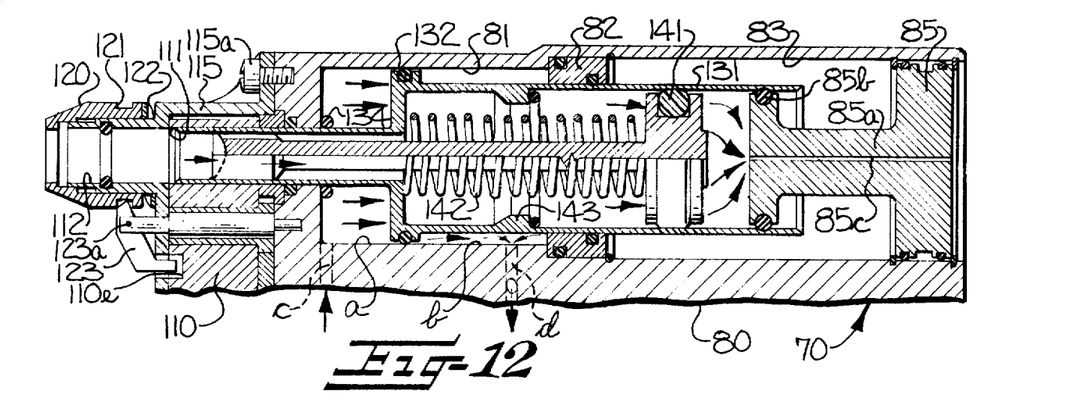
Figure 13:
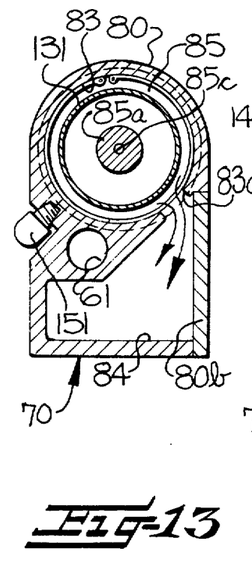
FIGS. 13 through 16 are transverse vertical sectional views taken substantially along the respective lines 13—13, 14—14, 15—15 and 16—16 in FIG. 7.
Figure 14:
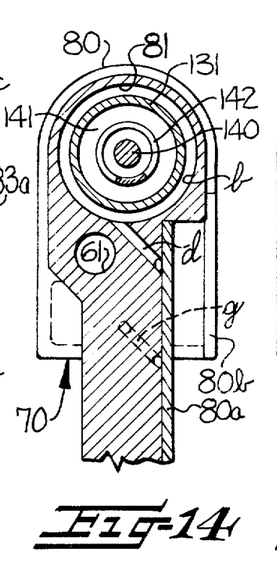

The rear end of main pressure chamber 83 may be closed by a closure cap 85 having a reduced stem 85a projecting axially inwardly therefrom and terminating in an enlarged valve piston 85b. Piston 85b may be termed as a "static piston" since it is stationary or fixed with respect to gun housing 80. Static piston 85b is of substantially less diameter than the internal diameter of main pressure chamber 83 and has a suitable annular sealing means thereon for, at times, sealingly engaging and thereby closing the otherwise open rear end of aligner cylinder 131. When the static piston 85b closes the rear end of aligner cylinder 131, as shown in FIGS. 7 and 12, limited communication of the interior of aligner cylinder 131 with the outside atmosphere is permitted through a small passage or orifice 85c extending throughout the length of closure cap 85, stem 85a and static piston 85b.

Referring again to the tack striker member 140, it is apparent by referring to FIGS. 7, 9, 11 and 12 that it is preferred that the free or front end of tack striker member 140 is shaped to conform substantially to the shape of the rear surface of the head of each successive tack to be engaged by the tack striker member 140. Also, tack striker member 140 is suitably splined or slotted along its length to permit a flow of air along sleeve 130 as may be necessary during the reciprocation of tack striker member 140 relative to sleeve 130. The tack striker member 140 is a form of piston rod in that it has a reduced portion extending rearwardly therefrom and connected to a striker piston 141 provided with a suitable annular sealing means thereon engaging the inner surface of tack aligning cylinder 130.

A compression spring 142 extends between and engages the proximal surfaces of piston 141 and that portion of piston 132 defining the inner surface of the front wall of aligner cylinder 131. Thus, spring 142 normally urges tack striker member 140 and its piston 141 from left to right in FIGS. 7, 9, 11 and 12 relative to aligner cylinder 131. It is apparent that a suitable resilient sealing means may be provided between the proximal surfaces of closure collar 82 and aligner cylinder 131. Additionally, a suitable sealing means or O-ring 134 encircles aligner sleeve 130 within main cylinder 81 and may serve as a limiting means to prevent piston 132 from bottoming against the left-hand or front wall of cylinder 81.

Thus, within cylinder 81, an air flow chamber $a$ is defined between aligner piston 132 and the front wall of main cylinder 81 (FIGS. 7, 9, 11 and 12) and an air flow chamber $b$ is defined between closure collar 82 and the relatively small annular rear surface of aligner piston 132. Relatively small air flow passages $c$, $d$ are provided in main housing 80 and extend from the respective air flow chambers $a$, $b$ for communication with the housing of pilot valve 90, which housing is suitably secured in the main housing 80 of the gun 70 and has a longitudinally extending valve core 92 mounted for longitudinal movement therein. Valve core 92 is normally urged forwardly to an inactive position by a suitable spring 93 (FIGS. 8 and 10) and has a cap or head 94 on the front end thereof adapted to be engaged by the rear surface of the lower portion of trigger 100.

Main housing 80 of gun 70 also has a pair of exhaust ports $e$, $f$ therein which are positioned forwardly of pressure reservoir chamber 84 and provide communication of the housing of valve 90 with the outside atmosphere. The housing of pilot valve 90 also communicates with a passage $g$ formed in main housing 80 and communicating with the pressure reservoir chamber 84.

Pilot valve 90 may be of well-known type which, when at rest, will have its core 92 occupying the position of FIG. 8 with valve core 92 effecting communication between chambers $a$ and 84 through passages $c$, $g$, and with chamber $b$ communicating with the atmosphere through passage $d$ and exhaust port $f$. Conversely, when valve 90 is actuated by trigger 100, as in FIG. 10, core 92 then provides communication between air flow chamber $b$ and pressure reservoir 84 via passages $d$, $g$, while providing communication between air flow chamber $a$ and the atmosphere via passageway $b$ and exhaust port $e$. It should be noted that the hand grip cover 80a, which is shown removably secured to the left-hand side of main housing 80 in FIG. 6, has been removed from main housing 80 in FIGS. 7 and 20 so that the passages $b$, $d$, $g$ and ports $e$, $f$ may be clearly illustrated. Thus, exhaust ports $e$, $f$ extend through hand grip cover 80a in FIG. 6. Additionally, a pressure reservoir cover 80b, which is shown removably secured to the rear portion of main housing 80 in FIG. 6, is removed in FIGS. 19 and 20 for purposes of clarity.

MAGAZINE RATCHET MECHANISM

Figure 17:
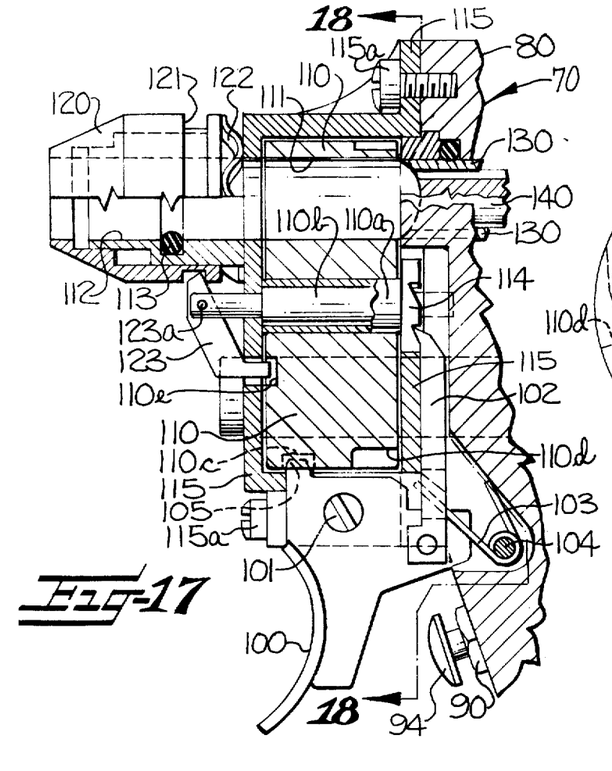
FIG. 17 is an enlarged fragmentary vertical sectional view, partially in elevation, similar to the left-hand portion of FIG. 7 and particularly illustrating how the trigger is operatively connected to the tack magazine.
Figure 18:
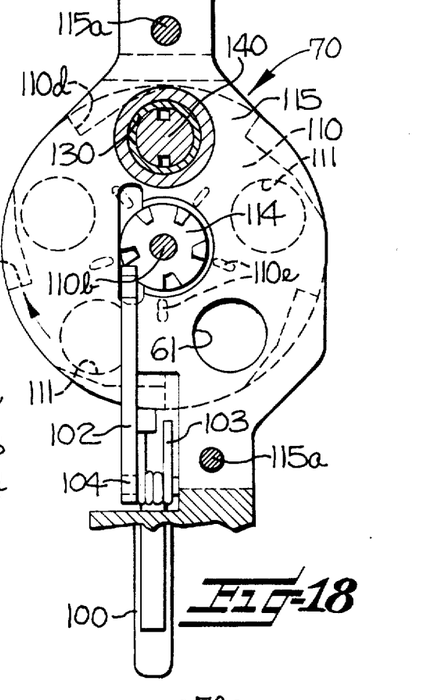
FIG. 18 is a fragmentary elevation, partially in section, taken substantially along the line 18—18 in FIG. 17.
Figures 19, 20:
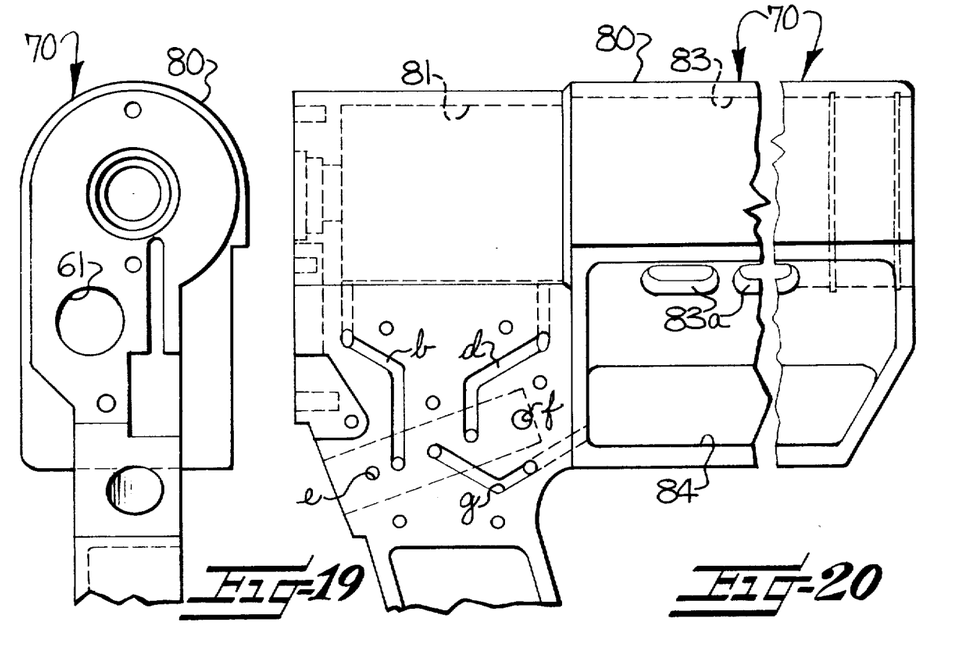
FIG. 19 is an enlarged front elevation of the gun housing with other parts of the gun removed therefrom.
FIG. 20 is a fragmentary left-hand side elevation of the gun housing looking at the right-hand side of FIG. 19.

Referring now to the rotatable magazine or tack indexing cylinder 110, it will be observed in FIG. 17 that cylinder 110 is mounted on a bushing 110a rotatably mounted on a shaft 110b whose reduced rear end, rearwardly or indexing cylinder 110, is mounted in the front portion of main housing 80. The reduced rear end of shaft 110b also has a ratchet wheel 114 loosely mounted thereon which may be integral with or suitably secured to the rear end of bushing 110a. Ratchet wheel 114 is preferably of about the same thickness as the rear wall of a magazine bracket 115 suitably secured, as by screws 115a, to the front surface of main gun housing 80. The distance between the front and rear walls of magazine bracket 115 preferably is only slightly greater than the overall length of the tacks to be used in the gun 70, and the magazine 110 should fit loosely between the front and rear walls of magazine bracket 115 as best shown in FIG. 17. This permits air to exhaust from the egress end of tack conveyor tube 60, through passage 61 and past magazine 110 to the atmosphere.

In order to index magazine 110 one-fifth of a revolution each time trigger 100 is moved from the normally inactive position of FIG. 17 to at least an intermediate active position, as in FIG. 7, trigger 100 is pivotally mounted, as at 101, on a lower portion of magazine bracket 115, immediately below the magazine 110. The rear portion of trigger 100 has the lower end portion of an elongate ratchet pawl 102 pivotally mounted thereon and extending into a suitable slot provided therefor in the front surface of main housing 80. The upper end of ratchet pawl 102 engages the teeth of ratchet wheel 114. Ratchet pawl 102 is normally biased into engagement with ratchet wheel 114 by a suitable torsion spring 103 (FIGS. 17 and 18) mounted on a stud 104 carried by main housing 80.

It is apparent that, each time trigger 100 is moved from the position of FIG. 17 at least to taht of FIG. 7, ratchet pawl 102 is moved upwardly in FIGS. 17 and 18 to impart one-fifth of a revolution in rotation to ratchet wheel 114 and magazine 110, thus moving a filled magazine chamber 111 into alignment with the barrel 112 at the same time that an empty chamber 111 is moved into alignment with tack receiving passage 61 in the lower portion of main housing 80.

In order to insure that magazine 110 is rotated exactly one-fifth of a revolution each time trigger 100 is activated in the manner last described, and to also insure that magazine 110 will not be rotated inadvertently while trigger 100 occupies the inactive or normal position shown in FIG. 17, the peripheral surface of magazine 110 is provided with two series of circularly spaced notches 110c, 110d therein, there being one of each of the notches 110c, 110d corresponding to each magazine chamber 111. The notches 110c are disposed in the front portion of magazine 110 and the notches 110d are positioned in the rear portion of magazine 110. Notches 110c are so positioned that one of them is positioned in alignment with and is engaged by a latching projection 105 on the forward upper portion of trigger 100 when trigger 100 occupies the inoperative or inactive position of FIG. 17 and a corresponding magazine chamber 111 is properly positioned at the tack driving station in alignment with barrel 112. Each of the notches 110c has a vertical wall on the opposite sides thereof so that the magazine 110 cannot be rotated in either direction about its axis whenever a notch 110c is being engaged by the latching projection 105 on trigger 100.

The rear peripheral notches 110d in magazine 110 are positioned so as to be engaged by the rear portion of trigger 100 when it is pivoted rearwardly about the pivot axis 101 as shown in FIG. 10. It will be observed in FIG. 18 that each of the notches 110d is provided with a cam surface leading into the same so that the rear portion of the trigger 100 serves only to engage the trailing surface of each successive notch 110d during the course of rotation of the magazine 110 for restricting the magazine 110 against further rotational movement until the trigger 100 is subsequently released, thus insuring that inertia will not cause trigger 100 to rotate magazine 110 beyond the desired predetermined position in the course of each actuation of trigger 100 by the operator.

Additional safety means also is provided to insure that trigger 100 cannot be accidentally actuated by an operator unless the free end of nozzle 120 is in pressure engagement with a surface material, thereby avoiding accidental firing of the gun which might be hazardous to other workmen who may happen to be nearby. To this end, it will be observed in FIG. 17 that nozzle 120 is provided with a peripheral groove 121 adjacent its rear portion and is also mounted for axial forward and rearward movement on the forward portion of barrel 112. Barrel 112 is, of course, suitably secured to or formed integral with the upper portion of magazine bracket 115.

The nozzle 120 is normally biased forwardly to an inactive position relative to bracket 115 by a suitable wave spring 122 disposed between the front wall of bracket 115 and the rear end of nozzle 120. The peripheral groove 121 in nozzle 120 is engaged by a latching lever 123 which is pivoted, as at 123a, on the reduced front end portion of shaft 110b. The lower portion of latching lever 123 loosely penetrates the front wall of magazine 115 and is adapted to successively engage a circular series of recesses or notches 110e provided in the front surface of magazine 110. Obviously, there is one of the notches 110e provided for each of the magazine chambers 111 and so positioned as to be engaged by the latching lever 123 whenever one of the notches 110c is in position to be engaged by the latching projection 105 on trigger 100.

It should be noted that latching lever 123 normally prevents the nozzle 120 from being moved forwardly beyond predetermined limits by the wave spring 122. On the other hand, the force of the wave spring acting against the rear surface of the nozzle 120 normally maintains the latching lever 123 in latching engagement with a corresponding notch 110e in the front space of magazine 110. Thus, since trigger 100 cannot be actuated by an operator without imparting a step in rotation to magazine 110 through the ratchet pawl 102 and ratchet wheel 114, it follows that trigger 100 cannot be actuated unless nozzle 120 is depressed by engagement thereof with a surface material or workpiece and by an operator applying sufficient forward force to the gun to cause the barrel 112 and bracket 115 to move forwardly relative to nozzle 120 sufficiently to release latching lever 123. In other words, when the nozzle 120 is moved from left to right relative to the barrel 112 in FIG. 17, the front wall of the peripheral groove 121 in nozzle 120 engages and imparts rearward movement to the upper end of latching lever 123 in FIG. 17, thus withdrawing the lower portion of latching lever 123 out of engagement with the corresponding notch 110e in magazine 110. Thus, trigger 100 then may be actuated by an operator.

TACK FEEDING MEANS

As indicated earlier herein, each time trigger 100 is actuated and a tack is discharged from gun 70, a tack from the supply source 40 (FIG. 1) is pneumatically conveyed along conveyor tube 60 into gun 70. A preferred embodiment of apparatus for effecting such conveyance of each successive tack will now be described.

As shown in FIGS. 1, 5, 21 and 22, the supply source 40 for the tacks is shown in the form of a vibratory spiral feeder or bowl which may be of any well-known type such as is manufactured by Syntron Division of FMC Corporation, Homer City, Pennsylvania under their model number ED-00, for example. Accordingly, a detailed description of the feeder bowl is deemed unnecessary.

Figures 22, 23:
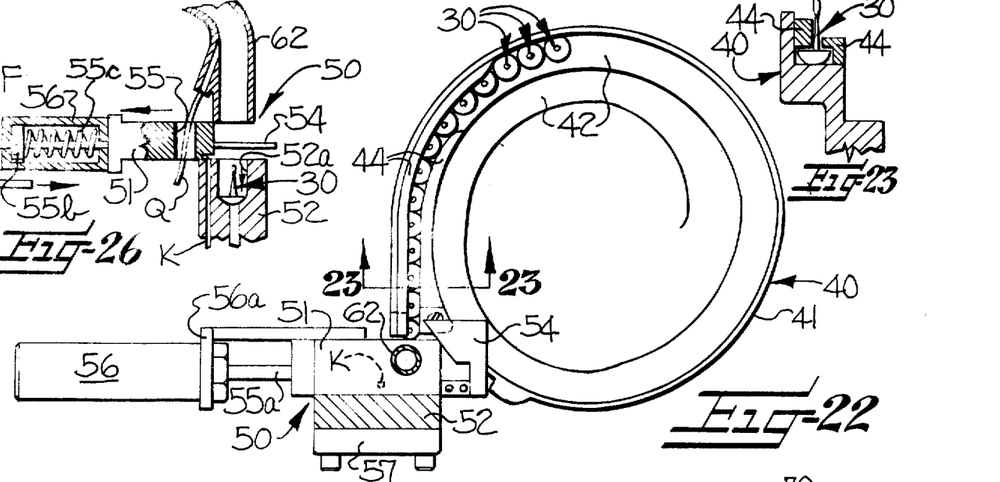
FIG. 22 is a top plan view, partially in section, taken substantially along line 22—22 in FIG. 21.
FIG. 23 is a fragmentary vertical sectional view taken substantially along line 23—23 in FIG. 22.

The vibratory bowl has an upwardly spiraling raceway or track 42 therein upon which the successive tacks in the bowl are caused to move upwardly due to vibration of the bowl 41 and, since the heads 33 of the tacks 30 (FIG. 3) are the heaviest portion of each tack, the tacks move up the trackway 42 with their shanks facing upwardly, as shown in FIG. 23. As the tacks move toward the uppermost portion of the spiral track 42, the heads 33 thereof pass under a pair of guide members 44 which overlie the upper portion of track 42 and between which shanks of the tacks project upwardly as shown in FIG. 23. The upper or egress portion of the trackway 42 terminates adjacent the transfer head of an escapement mechanism 50, which transfer head is indicated at 51.

The transfer head 51 is guided for substantially horizontal movement in an upstanding guide block 52 carried by a standard 53 (FIG. 21) upon which vibratory bowl 41 is mounted. The transfer head 51 has a tack interceptor 54 on its free end and is provided with a vertically extending passage 55 in a medial portion thereof which is of a diameter slightly greater than the diameter of the heads of the tacks 30. The transfer head 51 normally is positioned so that it restrains the tracks on the egress portion of the spiral track 42 against movement off of the end of the track 42. However, upon an active stroke being imparted to transfer head 51, by means to be later described, the interceptor 54 then moves with transfer head 51, from the position of FIG. 22 to that of FIG. 26, and is so shaped as to cam the next succeeding tack on the track 42 onto the upper surface of the corresponding portion of block 52.

Figures 24, 25, 26:
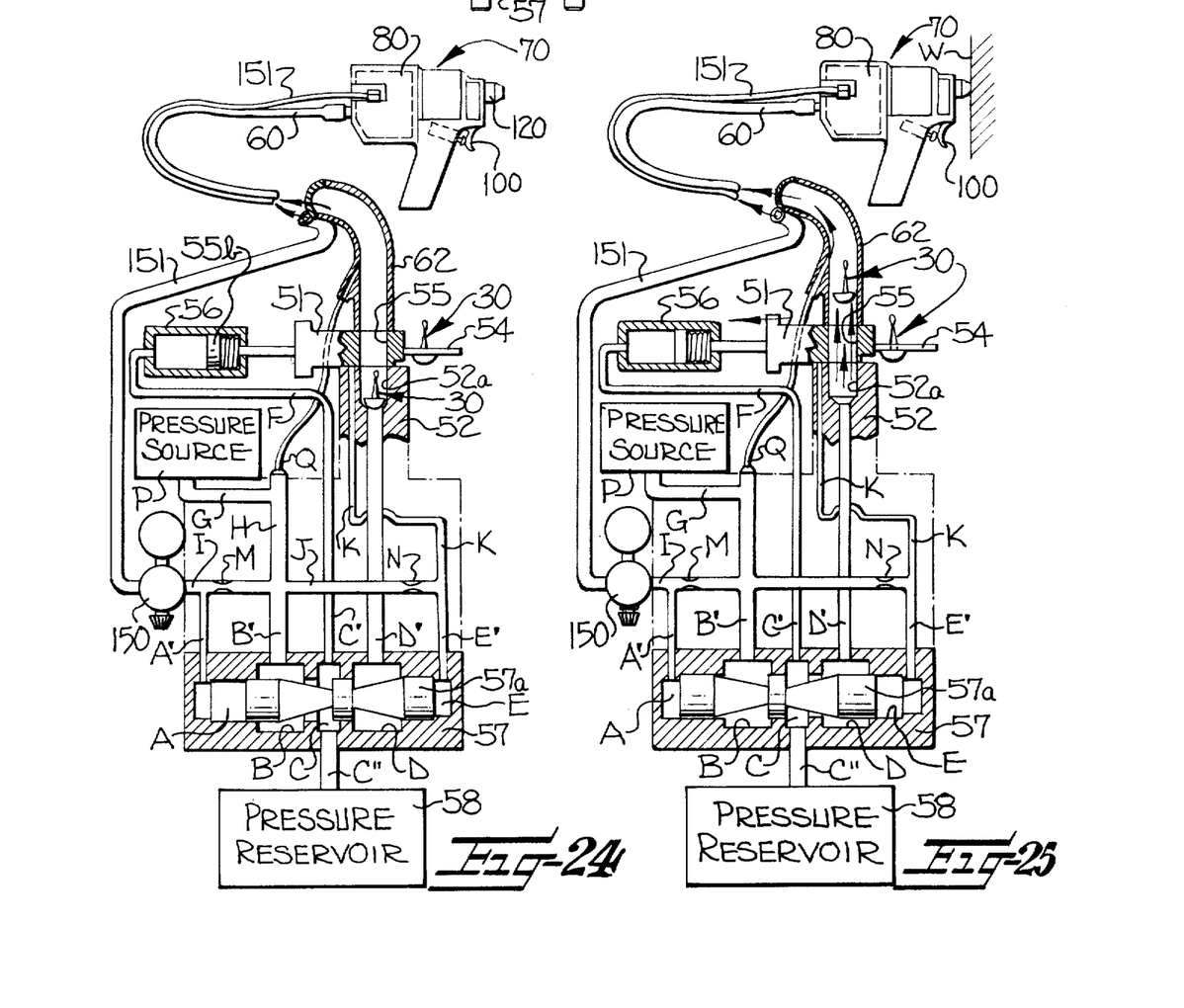
FIGS. 24 and 25 are schematic views particularly illustrating the pneumatic circuit between the tack driving gun and a pressure source, and wherein the parts occupy a position of rest in FIG. 24 and occupy a tack conveying position in FIG. 25.
FIG. 26 is a fragmentary vertical sectional view similar to medial portions of FIGS. 24 and 25, but showing the tack escapement mechanism occupying a different position from that shown in FIGS. 24 and 25.

In so doing, interceptor 54 also imparts movement to the corresponding tack from right to left in FIGS. 22, 24 and 25, thus transferring the corresponding tack from the track 42 into a cavity or receptacle 52a formed in the upper surface of the block 52 over which the transfer head is adapted to move. The receptacle 52a may also be termed as a tack receiving station of the escapement mechanism 50. Disposed above and in alignment with receptacle 52a, and immediately above the path of travel of transfer head 55, there is the open lower end or ingress end of a rigid tube 62 which aids in directing each successive tack into the ingress end of the flexible conveyor tube 60 connected thereto. Thus, if follows that the rigid tube 62 may be considered as a part of the pneumatic conveyor tube for conveying successive tacks from the escapement mechanism 50 into the gun 70.

Figure 21:
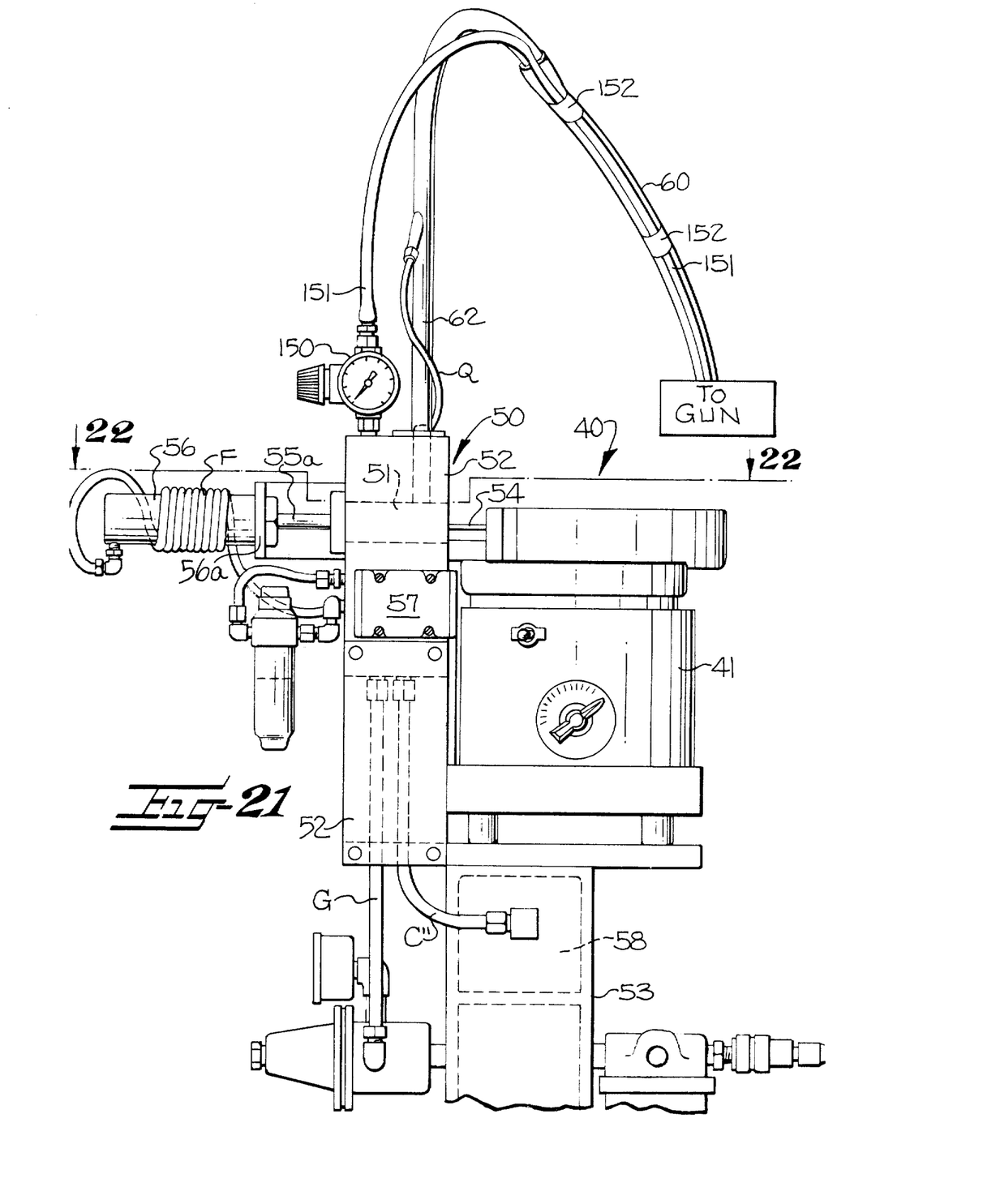
FIG. 21 is a greatly enlarged fragmentary elevation looking at the opposite side of the hopper and its stand from that shown in FIG. 5.

The transfer head 51 of escapement mechanism 50 is reciprocated by means of a piston rod 55a, one end of which is attached to transfer head 51 and the other end of which is attached to a piston 55b positioned within an air cylinder 56. As shown in FIG. 21, cylinder 56 is attached to a bracket 56a which is, in turn, suitably secured to the standard 53. The standard 53 and guide block 52 are of hollow construction and have a large number of air flow passages therein which are not specifically illustrated. However, for purposes of clarity, reference is made to FIGS. 24 and 25 for a schematic illustration of a pneumatic circuit arranged generally in the manner of the circuit partially embodied in the aforementioned large number of air flow passages in the standard 53 and the guide block 52 in order to avoid redundancy in the description.

As shown in FIG. 21, a pneumatic relay valve 57 is suitably secured to one side of guide block 52, and it will be observed in FIGS. 24 and 25 that the housing of relay valve 57 contains a spool-like axially movable core 57a therein and is provided with a series of valve chambers A–E therein which communicate with respective passages A'–E' in guide block 52. A conduit C'' also connects the chamber C of relay valve 57 to a tack conveying pressure reservoir 58 formed in the standard 53. A conduit F communicatively connects the passage C' to the end of air cylinder 56 opposite from piston rod 55a.

The guide block 52 also is provided with internal passageways G–K therein with passage A' being connected to passage I and passage E' being connected to passage J. Passages E' and K are in alignment with each other with passage K also being connected to passage J. Additionally, passages B' and H are aligned with each other and connected to and communicate with the adjacent intercommunicating ends of passages I, J. Passage D' extends from valve chamber D to the lower end of the receptacle 52a in which each successive tack is received as it is transferred from the vibratory bowl 41 into the receptacle 52a by the interceptor 54 on the free end of transfer head 51. The passages I, J are provided with respective restrictions M, N therein disposed upstream of the respective passages A', E', with respect to the source of fluid pressure or compressed air P to which the end of passage G remote from passage H is connected by conduit means such as is indicated at G' in FIG. 21.

As shown in FIGS. 21, 24 and 25, a suitable manually controlled pressure regulator valve 150 is carried by guide block 52 and connects passage I to the ingress end of a relatively small, flexible, air flow conduit or tube 151. Preferably, tube 151 is of about the same length as conveyor tube 62 and, since its end remote from guide block 52 is connected to the gun 70 for communication with the main pressure chamber 83 and thus has to be moved about with the gun 70, it is desirable that suitable means, such as strips of adhesive tape 152 (FIG. 21), are provided for securing the two tubes 60, 151 together at various locations along the length thereof.

In order to prevent a tack positioned in that magazine chamber 111 then occupying the aforementioned tack receiving position from falling out of the same in the event of the operator tilting the nozzle of the gun upwardly, and thereby to avoid jamming the magazine against rotation, a relatively small air flow tube Q is connected at one of its ends to the passage H (FIGS. 24 and 25) and the other end of tube Q is communicatively connected to a medial portion of rigid tube 62 for continuous communication with the interior of the conveyor tube 60 and the tack receiving passage 61 in the gun 70. Although the pressure at the pressure source P might be quite high and preferably is about eighty pounds per square inch, the tube Q is very small in relation to other fluid passages in the pneumatic circuit so that only a very small volume of air flows into the conveyor tube 60 through the tube Q, and its velocity diminishes considerably as it expands in tube 60 and by the time the air stream from tube Q has reached the tack receiving passage 61 in the main housing 80 of tack driving gun 70. Thus, there is just enough air pressure acting on the head of any tack which might be present in the magazine 111 then positioned in alignment with the tack receiving passage 61 so as to maintain the tack within the latter magazine chamber until the gun trigger 100 is subsequently manually actuated to move the corresponding magazine chamber 111 and the tack therein out of alignment with the tack receiving passage 61 in the housing 80 of the gun 70. It is to be noted that, as air is blown into passage 61 (FIGS. 7 and 18) of gun 70 it is exhausted from the gun through the clearance spaces between rotary magazine 110 and housing 80 or bracket 115, which spaces are best shown in FIG. 17. Such air exhaust prevents any substantial build-up of back pressure in the active chamber 111 of magazine 110.

For purposes of brevity, an abridged description of the method of operation will now be given.

METHOD OF OPERATION

I. TACK DRIVING GUN AT REST
  A. Vibratory bowl 41 is electrically energized with a supply of tacks therein, at least some of which are positioned at the discharge end of spiral track 42 as shown in FIGS. 22 and 23.
  B. Transfer head 51 of escapement mechanism 50 occupies extended, tack-intercepting, position of FIGS. 21, 22, 24 and 25, with receptacle 52a containing a tack and passage 55 aligned with receptacle 52a and tube 62.
  C. Manually operable trigger 100 occupies inactive or released position of FIGS. 1, 6, 17, 18 and 24.
  D. Core 92 of pilot valve 90 occupies inactive position of FIG. 8.
  E. Core 57a of pneumatic relay valve 57 occupies position of FIG. 24.
    1. High air pressure; e.g., 80 pounds per square inch, from pressure source P effects a like pressure in those passages and chambers indicated at A, B, C, E, A', B', C', E', C'' and and G–K shown in FIG. 24.

2. High air pressure also is present in conduit F and cylinder 56.
3. Pressure reservoir 58 (FIG. 24) is fully charged with a high pressure volume of air slightly greater than the combined volume of valve chamber D, passage D', rigid tube 62, pneumatic conveyor tube 60 and tack receiving passage 61 in the lower portion of gun housing 80 in FIG. 7.
4. Air exhausted from passage H through small tube Q produces lower velocity air flow in conveyor tube 60, tack receiving passage 61 and magazine chamber 111 then occupying tack receiving station sufficient to retain tack therein by air pressure.
5. Outside atmospheric pressure in valve chamber D (FIG. 24) and passage D'.

F. Gun magazine top chamber 111, at tack driving station, is empty as in FIG. 17.
Tack aligning sleeve 130 and striker member 140 occupy the inactive, withdrawn, positions shown in FIGS. 7 and 17.
H. High air pressure is present in those chambers and passages indicated at a, c, g, 83 and 84 in FIG. 7, such pressure being directed thereto from the source P (FIG. 24) through passages G, H, I (FIG. 24) and conduit 151 shown in FIGS. 6, 7, 13 21, 24 and 25.
I. Gun chamber b and passage d are open to atmosphere through pilot valve 90 and exhaust port f.

II. LOAD GUN
A. Operator pushes gun forwardly with nozzle 120 against a workpiece to move barrel 112 forwardly relative to nozzle 120 and thereby release tack magazine 110 from latching lever 123 (FIG. 17).
B. Pull trigger 100 rearwardly from dotted-line position at least to solid line position shown in FIG. 7.
1. Latching projection 105 (FIG. 17) on trigger 100 withdraws from engagement with a notch 110c in magazine.
2. Ratchet pawl 102 is moved upwardly in FIGS. 17 and 18 a sufficient amount to impart one-fifth a revolution to magazine 110. If a tack was in immediately preceding magazine chamber 111, a tack now will be positioned at the tack driving station as in FIG. 7.
3. The proximal surfaces of the bracket between which the magazine 110 (FIG. 17) is loosely positioned serve as "wall means" for holding each successive tack T in the respective chamber 111 in the course of movement of the successive chamber away from tack conveying passage 61 and into alignment with barrel 112.

III. FIRE GUN
A. Operator pulls trigger to fully active position of FIGS. 10 and 25 either from the inactive position of FIG. 17 or from the intermediate position of FIG. 7.
1. Trigger engages cap 94 to move valve core 92 rearwardly and thereby activate pilot valve 90 as in FIG. 10.
  a. Pressurized air flows from gun pressure reservoir chamber 84 into chamber b, rearwardly of aligner piston 132, via passage g, pilot valve 90 and passage c.
  b. Air pressure acting against rear surface of aligner piston 132 moves aligner sleeve 130 forwardly under relatively light force relative to tack striker member 140 to push tack 30 then in tack driving station of magazine 110 forwardly until the leading surface of the head of the tack 30, adjacent the periphery thereof, is moved into engagement with the rear surface of the yieldable abutment means 113, as in FIG. 9. Shank of tack then extends forwardly parallel with the axis of the firing or discharge passage defined by the magazine chamber 111 then occupying the tack driving station and also defined by barrel 112 and nozzle 120.
  c. Note that O-ring 134 in FIG. 9 then prevents piston 132 from blocking communication between chamber a and passage c as air is exhausted therefrom through pilot valve 90 and exhaust port e.
2. Striker then operates as follows:
  a. As tack 30 is aligned against abutment means 113, rear end of aligner cylinder 131 moves forwardly of static piston 85b as in FIG. 9. This exposes rear end of striker piston 141 to high air pressure in main pressure chamber 83 to be augmented by volume of high air pressure in reservoir chamber 84.
  b. High volume of high pressure air from chambers 83, 84 of gun 70 enters rear end of aligner cylinder 131 and rapidly pushes striker piston 141 and its striker member 140 forwardly to strike the tack and eject the same from nozzle 120, thus driving the tack into the surface material. This effects a rapid pressure drop in chambers 83, 84.
B. Operation of striker member 140 effects feeding of another tack 30 to gun 70 as follows:
1. Sudden drop in air pressure in main pressure chamber 83 of gun 70 effects a sudden high velocity flow of air from pressure source P (FIG. 24) through passages G, H, I and conduit 151 into pressure chambers 83, 84 of gun 70. Such high velocity flow of air through restriction M produces a pressure drop in relay valve chamber A and passage A'.
2. Since pressure in right-hand valve chamber E of FIg. 24 then is greater than pressure in left-hand valve chamber A, relay valve core 57a is moved from right to left, from the position of FIG. 24 to that of FIg. 25.
3. Immediately upon movement of valve core 57a to the latter position, communication between the main pressure source p and pressure reservoir 58 in interrupted as communication is established between pressure reservoir 58 and passage D, (FIG. 25). Thus, high pressure air from reservoir 58 quickly propels the tack last positioned in the receptacle 52a, out of the receptacle and through conveyor tube 60 into the tack receiving passage 61 (FIg. 7) of the gun 70, and into the magazine chamber 111 then at the tack receiving station. Thus, immediately after a tack is fired out of the tack driving station, a fresh tack is delivered into that chamber 111 of the magazine 110 then at the tack receiving station.
  a. Note that pressure from pressure reservoir 58 dissipates rapidly as the tack is propelled along the conveyor tube 60 so that, by the time the tack reaches the magazine chamber 111 then at the tack receiving station, only very little force of the air pressure is acting upon the tack so that it will not damage the front wall of magazine bracket 115 (FIG. 17) and will not be damaged itself by the impact thereof. Also, this prevents the tack from bouncing backwardly after it has contacted the front wall of the magazine bracket 115, notwithstanding the fact that a continuous relatively low velocity flow of air is introduced into the conveyor tube 60 via the small tube Q (FIGS. 24 and 25).

4. Since the passage C' and valve chamber C are no longer in communication with the pressure source P and the pressure in reservoir 58 is rapidly dissipated, the pressurized air then exhausts from the left-hand end of the escapement cylinder 56 so that the spring 55c therein (FIG. 26) moves transfer head 51 from right to left in FIGS. 22, 24 and 25 to the withdrawn position of FIG. 26. In so doing, interceptor 54 engages the then leading tack on spiral track 42 and pulls the tack so that it drops into receptable 52a where it rests with its shank facing upwardly as shown in FIGS. 24 and 26.

IV. OPERATOR RELEASES TRIGGER

A. When trigger 100 is released, valve core 92 of pilot valve 90 returns to the position of FIG. 8 from that of FIG. 10, permitting high air pressure to enter gun chambers $a$ forwardly of piston 132 via conduit 151, gun chambers 83, 84 passages $g$, $c$ and pilot valve 90. Since the left-hand or front surface area of piston 132 is substantially greater than the rear surface area of striker piston 141, even though piston 141 then is engaging the stop ring or abutment 143 in cylinder 131, the pressurized air entering chamber $a$ imparts rearward movement to aligner cylinder 131 as air is exhausted from chamber $b$ through passageway $d$, pilot valve 90 and port $f$ to atmosphere. In so doing, abutment 143 imparts rearward movement to striker piston 141.

1. Aligner cylinder 131 then engages and is sealed by static piston 85b as in FIG. 12.
   a. Since orifice 85c then is closed, pressure builds up in the gun chambers 83, 84 as aligner cylinder 131 and sleeve 130 continue to move rearwardly to position of FIG. 7.
   b. Also, since high pressure is no longer present between pistons 85b, 141, spring 142 returns striker piston 141 and striker member 140 to the "at rest" position of FIG. 7 as air displaced by piston 141 is exhausted from aligner cylinder 131 through orifice 85c.

B. Return of core 57a of relay valve 57 to "rest" position.
1. When transfer head 51 is fully withdrawn by spring 55c, as described above with respect to FIG. 26, a recess 51a on the lower surface of transfer head 51 registers with and exposes the open upper end of passage K (FIGS. 24 and 25).
2. The sudden opening of the upper end of passage K causes a high velocity flow of air through passage J and restriction N into the passage K, thus effecting a sudden drop in air pressure in valve chamber E and passage E'.
3. Since trigger 100 has been released and pressure is increasing in chambers 83, 84, a relative higher pressure is effective in chamber A of relay valve 57 (FIGS. 24 and 25) to thereby return valve core 57a from left to right, from the position of FIG. 25 to that of FIG. 24. This recharges pressure reservoir 58, passageway C', conduit F and the left-hand end of cylinder 56 with high pressure air to return transfer head 51 to the normal operative position of FIGS. 22, 24 and 25 to complete a cycle in the operation of the apparatus.

SECOND EMBODIMENT OF THE INVENTION

Figures 27, 29:
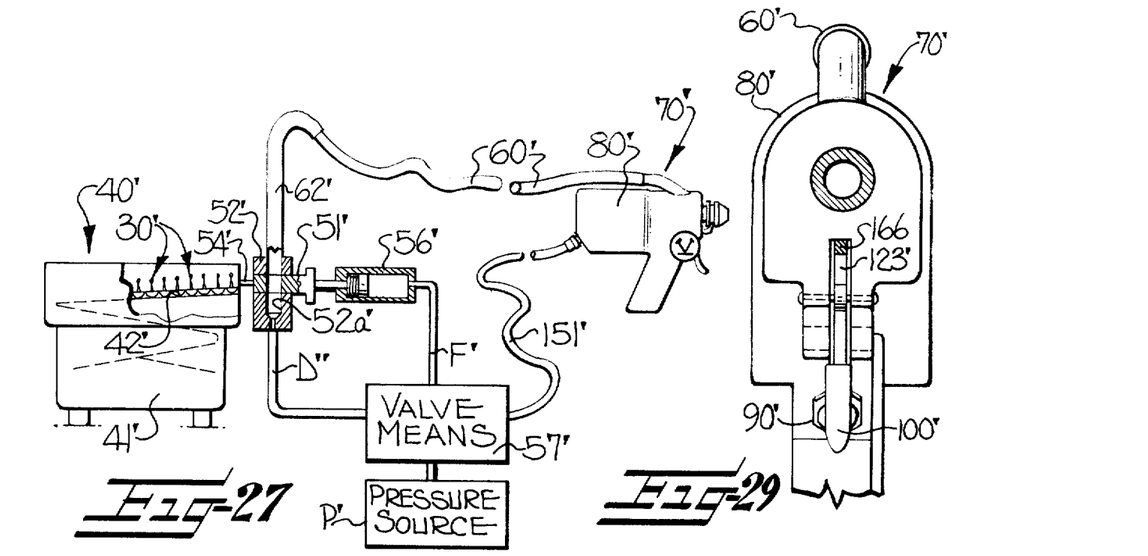
FIG. 27 is a view similar to FIG. 1, but showing a second embodiment of the invention.
FIG. 29 is a fragmentary elevation, partially in section, taken substantially along line 29—29 in FIG. 28.
Figure 28:
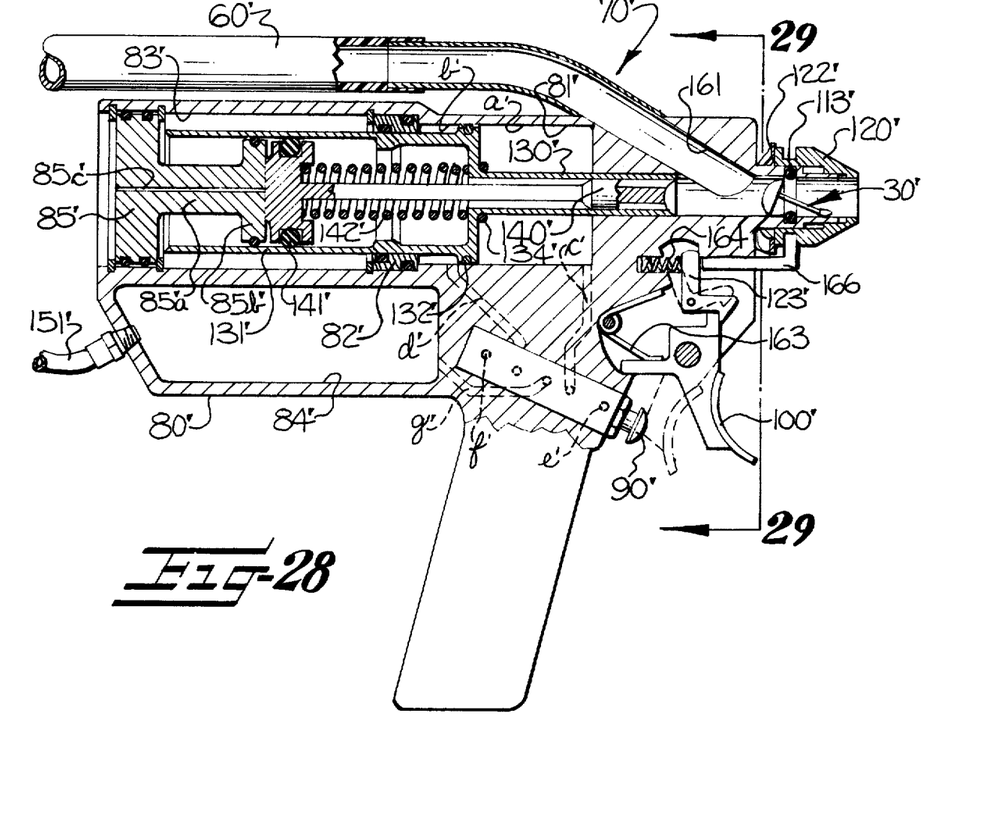
FIG. 28 is a longitudinal vertical sectional view through the second embodiment of the tack driving gun.

Referring to FIGS. 27–29, there is shown a second embodiment of improved apparatus for carrying out the method of feeding, aligning and driving into a surface material tacks of the type illustrated by way of example in FIGS. 2 and 3. Primarily, the second embodiment of apparatus shown in FIGS. 27–29 differs from the first embodiment shown in FIGS. 1 and 5–26 in that each successive tack is fed directly into the same passage from which the tack is subsequently driven into a surface material. In other words, the tack driving gun shown in FIG. 28 does not have a rotatable magazine or tack indexing cylinder such as that indicated at 110 in FIGS. 6, 7, 9, 11, 16, 17 and 18. In other respects, the tack driving gun shown in FIG. 28 may be constructed and operated in essentially the same manner as that described for the first embodiment of the tack driving gun 70. Therefore, those parts of the second embodiment of the apparatus which correspond to like parts of the first embodiment of the apparatus will bear the same reference characters with the prime notation added, where applicable, to avoid repetitive description.

Instead of the tack conveyor tube 60' being connected to a passage in the lower portion of the housing 80' for communication with a lower chamber in a rotatable magazine, as is the case with respect to the first embodiment of the tack driving gun, it will be observed in FIG. 28 that the egress end of conveyor tube 60' is suitably connected to the upper portion of the main housing 80' of tack driving gun 70' for communication with a forwardly and downwardly inclined passageway 161 which enters the tack receiving passage defined by the barrel 112' of the gun 70' at a relatively low angle of about 20° to 30°. The passageway 161 enters into the passage defined by barrel 112' at a point forwardly of the normal inactive position of the front ends of tack aligner sleeve 130' and tack striker member 140', but at a point spaced a relatively short distance rearwardly of the yieldable annular abutment means 113' projecting radially inwardly from the inner wall of gun barrel 112'.

It follows that the tack aligning sleeve 130' and striker 140' are operated in succession in exactly the same manner as that described for the tack aligner sleeve 130 and striker member 140 of the first embodiment of the invention to straighten and then drive the tack into a surface material or workpiece. Thus, a more detailed description of the apparatus shown in FIG. 27–29 is deemed unnecessary. It will be observed, however, that the trigger 100' normally is urged to an inactive or forward position by a torsion spring 163, and the trigger 100' normally is maintained in the inactive or forward position by means of the latching lever 123'.

The latching lever 123' differs from that shown in FIG. 17 and is engaged by a compression spring 164 carried by the housing 80' for normally urging latching lever 123' into operative or latching engagement with respect to the upper forward portion of trigger 100'. Additionally, an actuating arm or extension 166 is carried by the nozzle 120' and is so positioned and guided by the forward portion of the gun housing 80' as to impart counterclockwise movement to the latching lever 123' whenever the nozzle 120' is moved rearwardly in opposition to the spring 122' and relative to the barrel 112'. Thus, as the extension arm 166 moves rearwardly, it moves the latching lever 123' in a counterclockwise direction in FIG. 28 to thus release the trigger 100' so that it may be activated by an operator in the manner described with respect to the first embodiment of the invention.

It is thus seen that I have provided two embodiments of improved apparatus for carrying out the method set forth earlier herein. In the drawings and specification there have been set forth preferred embodiments of the invention and, although specific terms are employed, they are used in a generic and descriptive sense only, and not for purposes of limitation.

We claim:

1. The improvement in a method of handling and driving into a workpiece tacks of the type having a short blunt ended shank and a relatively large head of a diameter many times greater than the diameter of any portion of the shank; said improvement comprising the steps of pneumatically conveying successive blunt ended tacks of the type described, one at a time and shank first through a flexible tube and into a passage of a tack driving gun with the leading blunt end on the shank of each successive tack serving to prevent the tack from piercing and being arrested by the wall of the flexible tube while moving the successive tacks into a tack discharge passage in the gun, aligning the shank of the tack with the axis of the discharge passage by positioning only the front surface of the head of the tack adjacent its periphery in engagement with a yieldable restraining abutment means arranged in the discharge passage, with the shank of the tack being unrestrained, so as to position the head of the tack perpendicular of the discharge passage whereby the unrestrained shank of the tack extends forwardly parallel to the axis of the discharge passage, and then applying a forward striking force to the thus positioned tack to drive the same forwardly past the abutment means and through the discharge passage into the workpiece.

2. A method according to claim 1, in which the positioning of the front surface of the head of the tack in engagement with the yieldable restraining abutment means includes engaging and applying a forward force to the rear surface of the head of the tack so as to move the head of the tack forwardly against the yieldable restraining abutment means.

3. A method according to claim 1, wherein the moving of successive tacks into a tack discharge passage of the gun comprises inserting a tack in a magazine chamber of the gun and moving the magazine chamber with the tack therein about an axis offset from the axis of the gun chamber and into alignment with the discharge passage so that the gun chamber then forms a part of the tack discharge passage through which the tack is driven into the workpiece.

4. A method according to claim 1 including directing a substantially continuous low pressure flow of air into the gun toward the restraining abutment means therein to retain the conveyed tack in the gun against the abutment means.

* * * * *

UNITED STATES PATENT OFFICE
CERTIFICATE OF CORRECTION

PATENT NO. : 3,906,615
DATED : September 23, 1975
INVENTOR(S) : Robert L. Campbell, Jr., et al It is certified that error appears in the above-identified patent and that said Letters Patent are hereby corrected as shown below:

Column 1, Line 53, "tyde" should be --type--; same line "back" should be --tack--. Column 3, Line 34, "of" should be --on--. Column 3, Line 48, "tank" should be --tack--. Column 4, Line 68, "occupied" should be --occupies--. Column 5, Line 48, "13" should be --113--. Column 8, Line 51, "takt" should be --that--. Column 10, Line 57, "tracks" should be --tacks--. Column 13, Line 21, before "Tack" insert --G.--. Column 14, Line 53, "p" should be --P--. Column 16, Line 63, "FIG." should be --FIGS.--.

Signed and Sealed this sixth Day of January 1976

[SEAL]

Attest:

RUTH C. MASON
*Attesting Officer*

C. MARSHALL DANN
*Commissioner of Patents and Trademarks*